W. Grant.
Lathe Chuck.
Nº 6,046.            Patented Jan. 23, 1849.

UNITED STATES PATENT OFFICE.

WILLIAM GRANT, OF BOSTON, MASSACHUSETTS.

CHUCK FOR LATHES.

Specification of Letters Patent No. 6,046, dated January 23, 1849.

*To all whom it may concern:*

Be it known that I, WILLIAM GRANT, of Boston, in the county of Suffolk and State of Massachusetts, have invented a new and useful Self-Centering Universal Chuck, of which the following is a full and exact description, reference being had to the annexed drawings of the same, making part of this specification, in which—

Figure 1:
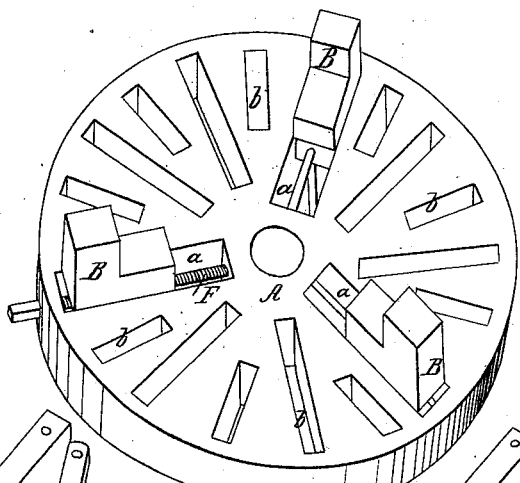
Figure 2:
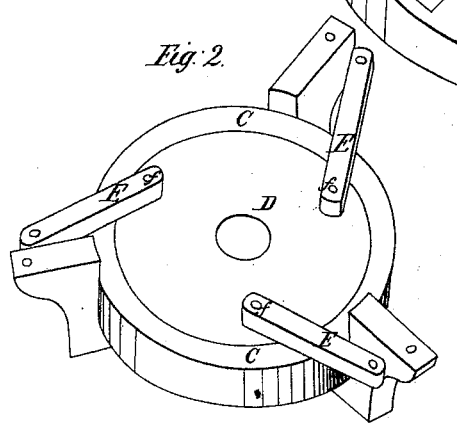
Figure 3:
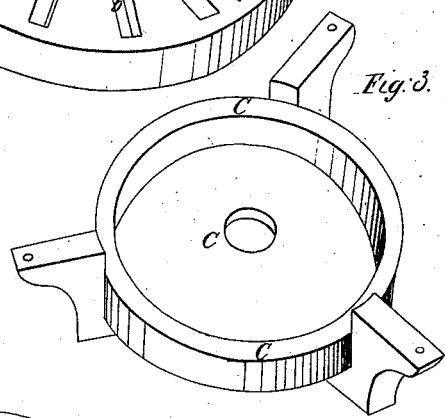
Figure 4:
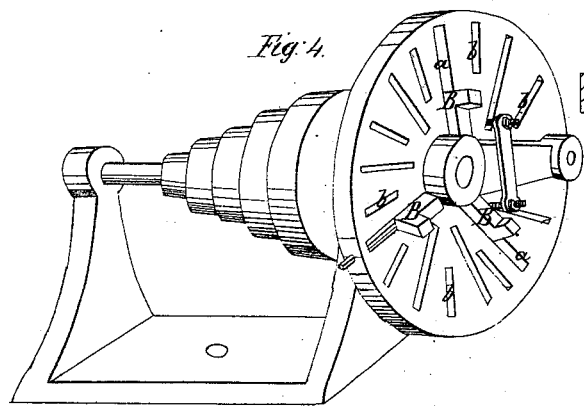
Figure 5:
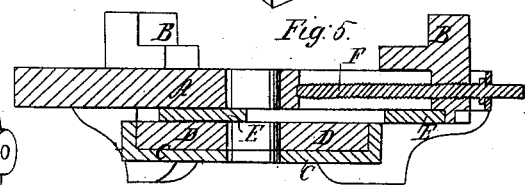
Figure 6:
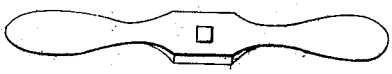

Figure 1 is a perspective view of the chuck, showing the face plate, jaws, and adjusting screws, Fig. 2 is a view of the back part of the chuck, the face plate being removed to show the manner in which the connecting rods join the jaws to the turning disk, and one of the modes in which the disk and jaws are simultaneously moved, Fig. 3 is a view of the back plate, the turning disk, connecting rods, jaws, and face plate being removed therefrom, Fig. 4 is a view of the chuck in operation having a crank secured upon it, for the purpose of having its eye bored out, Fig. 5 is a section parallel to its axis, and Fig. 6 is a wrench for turning the screw which operates the jaws.

The same letters indicate the same parts in all the figures.

One of the peculiarities of my chuck is, that without being made proportionately more ponderous than the rest of the lathe it will be quite as strong, and as free from liability to be broken. Its face plate can be slotted like the ordinary chuck plate, and irregular bodies whose center of gravity is eccentric to its center, can be chucked thereon with the utmost security by stirrups and T headed screw bolts, and heavy bodies of any description when centered by the jaws, may be secured by stirrups and bolts in the ordinary way, to take off the strain from the jaws. This chuck possesses all the advantages of the spiral screw chuck without any of its defects, does not cost half as much, and when of the same strength does not weigh so much by fifty per cent. besides being so simple in its structure that any machinist can, with common tools make or repair it, whereas the spiral chuck can only be made or repaired by the original manufacturer, who has costly machinery prepared for the express purpose of making them, and without which they cannot be made at any moderate cost.

In the accompanying drawings (A) is a common chuck plate having three radial slots *a* in which the jaws (B) slide, and numerous other holes and slots *b* for the stirrup bolts to pass through, this plate (A) is firmly secured to a back plate (C) by bolts or otherwise, the plate (C) has a female screw cut on the concave surface of its hollow axis, corresponding to the male screw on the end of the cone axis of the lathe upon which it is screwed, in the usual manner. Upon the front side of this plate a circular depression is turned out into which an annular disk (D) is accurately fitted, but not too tightly to admit of its turning freely. Upon the face of this disk a series of wrist pins ( ) in number corresponding with the jaws are placed, another similar series of pins project from the under side of the jaws, and these pins pass through the ends of the connecting rods (E) joining the jaws and disk (D) so that any one of the jaws being moved will turn the disk and move all the rest of the jaws at the same time through the same space. The plates being concentric with each other, and the connecting rods (E) of uniform length it follows that the jaws will at all times be concentric with the plates.

The jaws are moved toward or from the center by a screw (F) passing through one of them, or acting at a tangent upon the disk (D). It is obvious that there are various methods in which these screws may be arranged, but as they are merely the application of devices commonly known and well understood it is unnecessary here to describe them. The disk (D) may be dispensed with and cranks or a system of levers and connecting rods substituted therefor, this arrangement would not however change the principle upon which the jaws are moved.

The jaws are dove-tailed or otherwise secured into the slots *a* and all the surfaces of these jaws, as well as the other parts that slide in contact are well fitted and polished, the connecting rods, wrist pins, jaws, and set screws, I prefer to make of steel, with the joints tempered very hard to prevent their wearing rapidly, and getting out of order, the remainder of the parts it is best to make of cast iron.

The operation of this chuck is the same as that of all others made upon the adjustable, self centering principle, and will not therefore require a detailed description.

Having thus described the construction of my universal self centering chuck, what I claim therein as new and desire to secure by Letters Patent, is—

The combination of the connecting rods and jaws jointed together and moving simultaneously by means of a screw or otherwise, with the chuck plate; whether the several parts be made and arranged as herein set forth, or in any other substantially similar manner by which the jaws are moved toward or from the center of the plate at the same time, and at equal speed.

In testimony whereof I have hereunto set my hand this 11th day of October 1848.

WM. GRANT.

Witnesses:
WM. D. WASHINGTON,
P. H. WATSON.